US011939799B2

(12) United States Patent
Toyama

(10) Patent No.: US 11,939,799 B2
(45) Date of Patent: Mar. 26, 2024

(54) DOOR HANDLE DEVICE FOR VEHICLE

(71) Applicant: ALPHA CORPORATION, Kanagawa (JP)

(72) Inventor: Takao Toyama, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 805 days.

(21) Appl. No.: 17/007,954

(22) Filed: Aug. 31, 2020

(65) Prior Publication Data

US 2020/0392771 A1 Dec. 17, 2020

Related U.S. Application Data

(63) Continuation of application No. PCT/JP2019/007715, filed on Feb. 27, 2019.

(30) Foreign Application Priority Data

Mar. 9, 2018 (JP) ................................ 2018-042785

(51) Int. Cl.
*E05B 85/10* (2014.01)

(52) U.S. Cl.
CPC ................................ *E05B 85/107* (2013.01)

(58) Field of Classification Search
CPC ..... Y10T 292/57; E05B 85/107; E05B 85/10; E05B 85/103; E05B 81/76
See application file for complete search history.

(56) References Cited

U.S. PATENT DOCUMENTS

| | | | | |
|---|---|---|---|---|
| 9,080,352 B2 * | 7/2015 | Aerts | .................... | E05B 85/103 |
| 10,167,656 B2 * | 1/2019 | Park | .................... | E05B 85/107 |
| 10,533,353 B2 * | 1/2020 | Smart | .................... | E05B 81/76 |
| 11,499,352 B2 * | 11/2022 | Guerin | .................... | E05B 85/107 |
| 2009/0205383 A1 * | 8/2009 | Katagiri | .................... | E05B 17/18<br>70/237 |

(Continued)

FOREIGN PATENT DOCUMENTS

| | | | | |
|---|---|---|---|---|
| CN | 108193961 A * | 6/2018 | .......... | E05B 85/107 |
| CN | 108374615 A * | 8/2018 | .......... | E05B 85/107 |

(Continued)

OTHER PUBLICATIONS

International Search Report issued in PCT/JP2019/007715; dated Apr. 23, 2019.

(Continued)

*Primary Examiner* — Kristina R Fulton
*Assistant Examiner* — Steven A Tullia
(74) *Attorney, Agent, or Firm* — Studebaker & Brackett PC

(57) ABSTRACT

A door handle device for a vehicle includes a handle base, an operation handle, first and second link members disposed at an interval and rotatably pin-connected to the handle base respectively, and an electric actuator configured to rotatably drive the first link member. The operation handle is connected to the handle base so as to be able to protrude from an initial position to a use position. The operation handle is rotatably connected to end portions of the first and second link members. The handle base, the first and second link members, and the operation handle form a link mechanism in which the operation handle at the use position maintains a posture parallel to the initial position.

7 Claims, 8 Drawing Sheets

(56) References Cited

U.S. PATENT DOCUMENTS

| | | | | |
|---|---|---|---|---|
| 2013/0127185 | A1 | 5/2013 | Lang et al. | |
| 2013/0241215 | A1 | 9/2013 | Halliwell et al. | |
| 2015/0233153 | A1 | 8/2015 | Smart et al. | |
| 2015/0233154 | A1 | 8/2015 | Smart et al. | |
| 2015/0315826 | A1 | 11/2015 | Lang et al. | |
| 2016/0281397 | A1 | 9/2016 | Park et al. | |
| 2017/0306662 | A1* | 10/2017 | Och | E05B 81/76 |
| 2018/0058113 | A1* | 3/2018 | Han | E05B 85/103 |
| 2019/0112845 | A1 | 4/2019 | Porada | |
| 2019/0218835 | A1* | 7/2019 | Karlein | E05B 85/103 |
| 2019/0283555 | A1* | 9/2019 | Couto Maquieira | E05B 85/107 |
| 2019/0368239 | A1* | 12/2019 | Rhein | E05B 85/103 |
| 2019/0383066 | A1* | 12/2019 | Han | E05B 85/103 |
| 2020/0102773 | A1* | 4/2020 | Sobecki | E05B 85/107 |
| 2020/0354996 | A1* | 11/2020 | Bresser | E05B 85/103 |
| 2020/0392771 | A1* | 12/2020 | Toyama | E05B 81/06 |
| 2021/0087862 | A1* | 3/2021 | Guerin | E05B 81/42 |
| 2021/0156178 | A1* | 5/2021 | Heyduck | E05B 85/107 |
| 2022/0194188 | A1* | 6/2022 | Toyama | E05B 85/103 |
| 2022/0195762 | A1* | 6/2022 | Toyama | E05B 85/103 |
| 2022/0195763 | A1* | 6/2022 | Toyama | E05B 85/103 |
| 2023/0203857 | A1* | 6/2023 | Kim | B60Q 1/2669 70/208 |

FOREIGN PATENT DOCUMENTS

| | | | | | |
|---|---|---|---|---|---|
| CN | 111593977 | A | * | 8/2020 | E05B 79/06 |
| CN | 112780134 | A | * | 5/2021 | E05B 81/64 |
| CN | 114109160 | A | * | 3/2022 | E05B 77/06 |
| CN | 114737833 | A | * | 7/2022 | E05B 79/22 |
| CN | 115354927 | A | * | 11/2022 | B60J 5/0415 |
| DE | 197 31 325 | A1 | | 1/1999 | |
| DE | 102009018803 | A1 | * | 10/2010 | E05B 81/04 |
| DE | 10 2011 001 001 | A1 | | 6/2012 | |
| DE | 10 2016 104 372 | A1 | | 9/2017 | |
| DE | 102017130029 | A1 | * | 6/2019 | E05B 81/90 |
| DE | 102017130030 | A1 | * | 6/2019 | E05B 81/04 |
| DE | 102018101040 | A1 | * | 7/2019 | E05B 81/06 |
| DE | 102018121432 | A1 | * | 3/2020 | E05B 77/04 |
| DE | 102021209082 | A1 | * | 11/2022 | E05B 5/107 |
| EP | 3103946 | A1 | * | 12/2016 | E05B 81/06 |
| EP | 3071771 | B1 | * | 1/2018 | E05B 81/06 |
| EP | 3404176 | A1 | * | 11/2018 | E05B 77/34 |
| EP | 3617433 | A1 | * | 3/2020 | E05B 79/06 |
| GB | 2506350 | A | | 4/2014 | |
| GB | 2536669 | A | * | 9/2016 | B60J 5/0415 |
| GB | 2536670 | A | * | 9/2016 | E05B 5/003 |
| GB | 2595913 | A | * | 12/2021 | E05B 81/64 |
| JP | 2015-533964 | T | | 11/2015 | |
| JP | 2019210768 | A | * | 12/2019 | E05B 81/04 |
| KR | 20190072303 | A | * | 12/2017 | E05B 81/06 |
| KR | 102104888 | B1 | * | 1/2019 | E05B 81/32 |
| WO | WO-2008129003 | A2 | * | 10/2008 | E05B 85/107 |
| WO | 2015/074020 | A1 | | 5/2015 | |
| WO | 2016/113341 | A1 | | 7/2016 | |
| WO | WO-2016113340 | A1 | * | 7/2016 | E05B 81/82 |
| WO | 2017/070307 | A1 | | 4/2017 | |
| WO | WO-2018010939 | A1 | * | 1/2018 | E05B 81/76 |
| WO | WO-2019011528 | A1 | * | 1/2019 | E05B 79/06 |
| WO | WO-2019172057 | A1 | * | 9/2019 | E05B 81/06 |

OTHER PUBLICATIONS

The extended European search report issued by the European Patent Office dated Oct. 22, 2021, which corresponds to European Patent Application No. 19764655.7-1005 and is related to U.S. Appl. No. 17/007,954.

An Office Action; "Notice of Reasons for Refusal," mailed by the Japanese Patent Office dated Aug. 24, 2022, which corresponds to Japanese Patent Application No. 2021-164579 and is related to U.S. Appl. No. 17/007,954; with English language translation.

* cited by examiner

DOOR HANDLE DEVICE FOR VEHICLE

CROSS REFERENCE TO RELATED APPLICATIONS

This application claims priority from PCT application No. PCT/JP19/007715, which was filed on Feb. 27, 2019 based on Japanese Patent Application No. 2018-042785 filed on Mar. 9, 2018, the entire contents of which are incorporated herein by reference.

BACKGROUND OF THE INVENTION

Field of the Invention

The present invention relates to a door handle device for a vehicle.

Description of Related Art

A device described in Patent Literature 1 (JP-T-2015-533964) is known as a door handle device for a vehicle that is stored in a position not protruding from an outer surface of the vehicle when not in use and protruding from the outer surface of the vehicle when in use.

In a related-art example, a handle device that includes a housing and a handle rotatably connected to the housing around a pivot means is formed. The handle is housed in the housing when not in use and rotatably driven around the pivot means by a motor when in use.

A user can open the door by releasing a door latch device by gripping an end portion of the handle whose one end pops out of the housing by rotation and further rotating the end portion.

[Patent Literature 1] JP-T-2015-533964

In the above-described related-art example, since the end portion of the handle only protrudes to the outside in use, a handheld portion held by the user is narrow and is difficult to grasp, and thus the usability is poor.

SUMMARY

One or more embodiments provide a door handle device for a vehicle that is good in usability.

According to one or more embodiments, a door handle device for a vehicle includes a handle base, an operation handle, first and second link members disposed at an interval and rotatably pin-connected to the handle base respectively, and an electric actuator configured to rotatably drive the first link member. The operation handle is connected to the handle base so as to be able to protrude from an initial position to a use position. The operation handle is rotatably connected to end portions of the first and second link members. The handle base, the first and second link members, and the operation handle faun a link mechanism in which the operation handle at the use position maintains a posture parallel to the initial position.

BRIEF DESCRIPTION OF THE DRAWINGS

FIG. 1A is a front view illustrating a state of being fixed to a door of a vehicle. FIG. 1B is a cross-sectional view taken along a line 1B-1B in FIG. 1A.

FIG. 2A is a perspective view as viewed from a front side. FIG. 2B is a perspective view as viewed from a back side.

FIG. 3A is a cross-sectional view taken along a line 3A-3A in FIG. 1A. FIG. 3B is a diagram illustrating a configuration of links.

FIG. 4A is a diagram illustrating an initial rotation position. FIG. 4B is a diagram illustrating an operational rotation position. FIG. 4C is a diagram illustrating a use position.

FIG. 5A is a diagram illustrating a use state. FIG. 5B is a diagram illustrating an unlatched state.

FIG. 6A is a diagram corresponding to FIG. 3A. FIG. 6B is a diagram illustrating a configuration of links in FIG. 6A.

FIGS. 7A and 79 are diagrams illustrating an operation of link members. FIG. 7A is a diagram illustrating a use state.

DETAILED DESCRIPTION

Figure 1A:
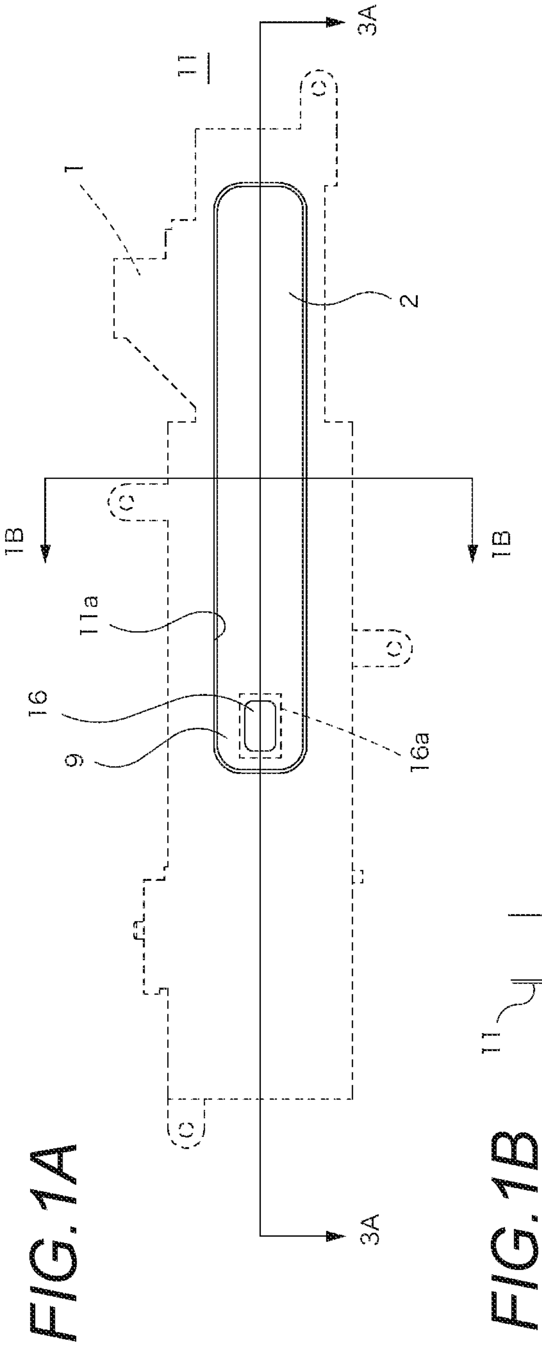
FIGS. 1A and 1B are diagrams illustrating an embodiment of the present invention.
Figure 1B:
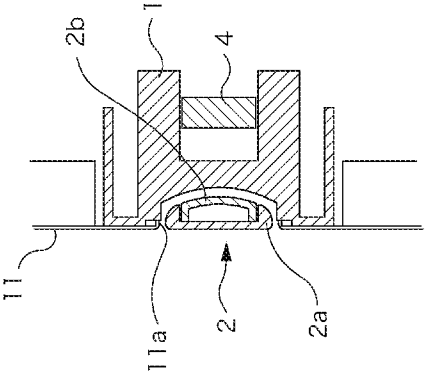
Figure 2A:
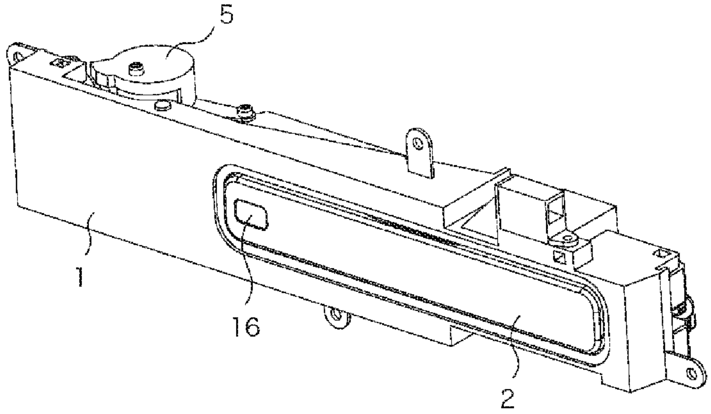
FIGS. 2A and 2B are diagrams illustrating a handle device.
Figure 2B:
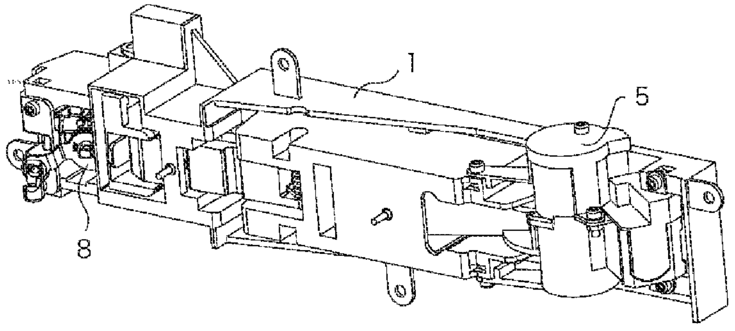

As illustrated in FIGS. 1A and 1B, a door handle device is formed by connecting an operation handle 2 to a handle base 1 via first and second link members 3, 4, and is fixed to a door of a vehicle on the handle base 1.

Figure 4A:
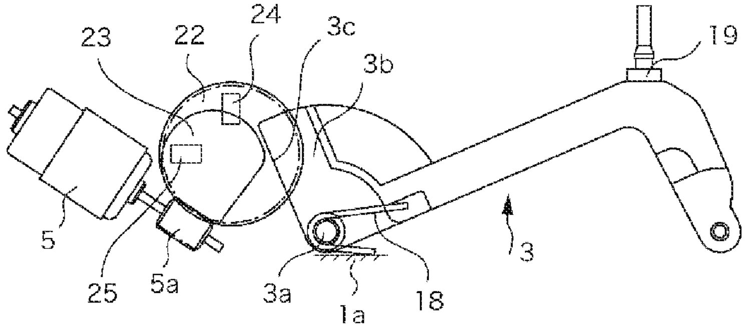
FIGS. 4A to 4C are diagrams illustrating an operation of a first link member.
Figure 5A:
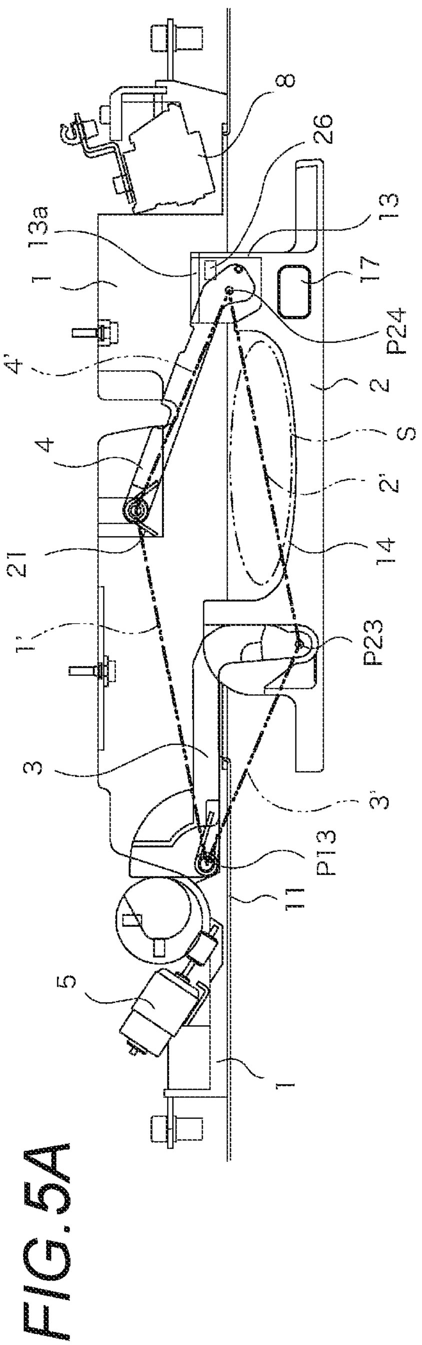
FIGS. 5A and 5B are diagrams illustrating an operation of link members.

There is provided a flush surface type handle device in which the operation handle 2 is movable between an initial position illustrated in FIG. 4A and a use position illustrated in FIG. 5A with the handle base 1 fixed to a door, and a surface of the operation handle 2 at an initial position is located on the same surface as a door surface (door outer panel 11) and is housed in a handle housing opening 11*a* formed in the door outer panel 11.

Figure 3A:
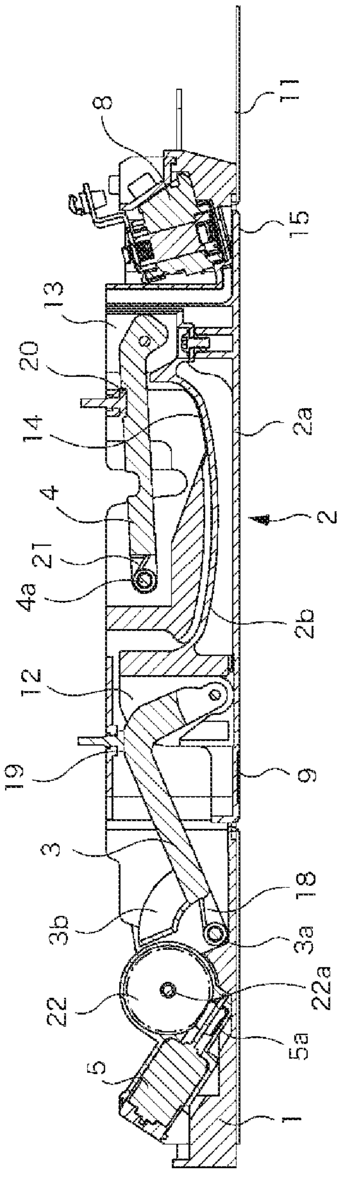
FIGS. 3A and 3B are diagrams illustrating the present invention.
Figure 3B:
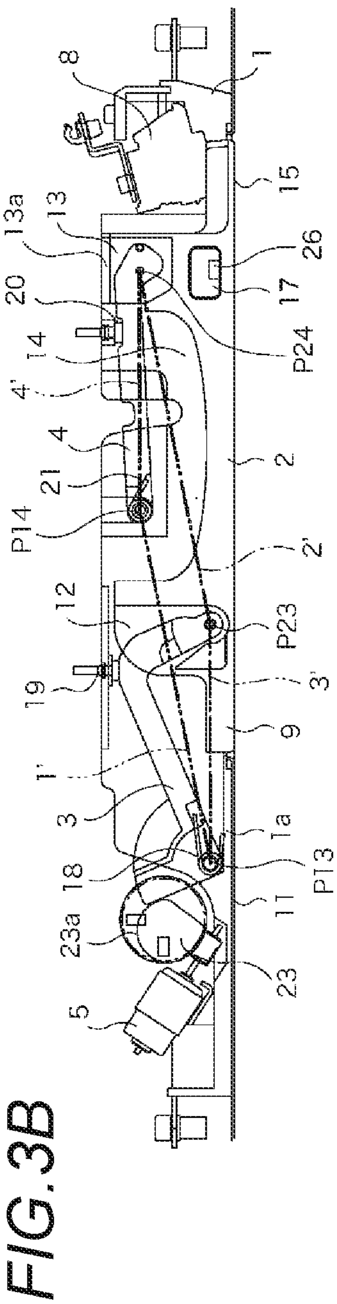

As illustrated in FIGS. 19, 3A and 3B, the operation handle 2 is formed by connecting a back cover 2*b* to a back surface of a handle body 2*a*, a front link connection portion 12 is provided at a front end portion of the handle body 2*a* (in the description, a left side is referred to as a "front side", a right side in FIG. 1A is referred to as a "rear side", a left side is referred to as a "front surface" direction, and an opposite direction in FIG. 1B is referred to as a "back surface" direction), and a rear link connection portion 13 is provided at a rear end portion so as to protrude toward a back surface side.

A handhold recessed portion 14 is formed between the front and rear link connection portions 12, 13 of the operation handle 2, and the back cover 2*b* forms a surface of the handhold recessed portion 14. Further, front and rear ends of the operation handle 2 extend further forward and rearward from the front and rear link connection portions 12, 13 respectively, an overhanging portion from the front link connection portion 12 to the front side is referred to as a pressing operation portion 9, and an overhanging portion from the rear link connection portion 13 to the rear side is referred to as a cylinder shielding portion 15.

A detection electrode 16*a* of an electrostatic capacitance sensor is disposed on the pressing operation portion 9 to form a locking/unlocking switch portion 16. In order to inform a user of the locking/unlocking switch portion 16, the locking/unlocking switch portion 16 is formed as a recessed portion.

Further, on a side wall portion of the rear link connection portion 13, precisely, on a side wall portion facing upward in a state of being fixed to the door, a detection electrode of the electrostatic capacitance sensor (not shown) and an initial position return switch 17 formed on a surface for informing the user of the detection electrode are disposed at positions immersed in the door when the operation handle 2 is at the initial position. A harness (not shown) connected to the detection electrode of the initial position return switch 17 is pulled out to the front end portion through a gap portion formed between a front cover and the back cover 2*b*.

On the other hand, the handle base 1 is disposed in contact with a back surface of the door outer panel 11, a first link member 3 is rotatably pin-connected to a front end portion, and a second link member 4 is rotatably connected to an intermediate portion.

Figure 4B:
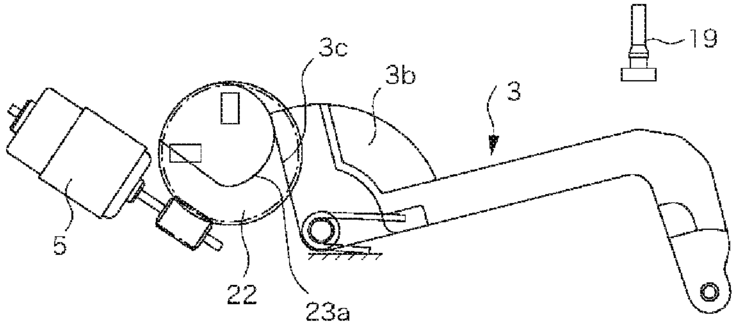
Figure 4C:
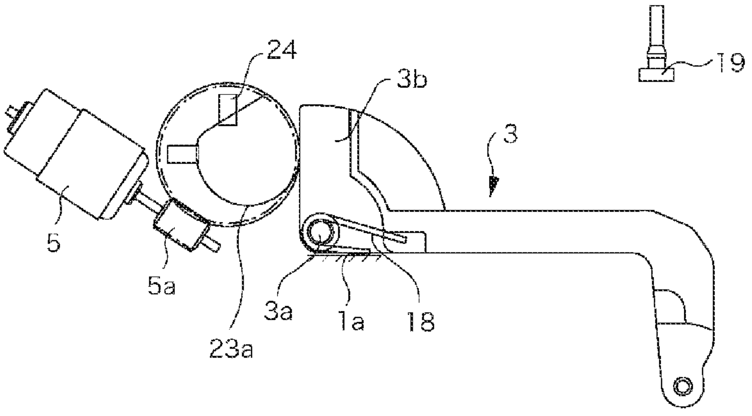

As illustrated in FIGS. 4A to 4C, the first link member 3 is pin-connected to the handle base 1 at a front end portion, and is urged counterclockwise in FIGS. 4A to 4C by a first torsion spring 18 wound around a connecting pin 3*a*. The handle base 1 is formed with a first spring receiving wall 1*a* with which one leg of the first torsion spring 18 comes into pressure contact.

Further, in the first link member 3, a fan-shaped follower portion 3*b* is provided at the front end portion, and an intermediate portion is bent toward the back surface side into a V-shape, and the bent portion is brought into pressure contact with a rubber first stopper member 19 formed on the handle base 1 and held at an initial rotation position.

One end of the second link member 4 is pin-connected to the handle base 1, the other end is pin-connected to the operation handle 2, and an intermediate portion is brought into pressure contact with a rubber second stopper member 20 formed on the handle base 1 and held at the initial rotation position. A second torsion spring 21 is wound around a rotation shaft 4*a* at a connection point of the second link member 4 and the handle base 1, and the second link member 4 is urged counterclockwise in FIGS. 3A and 3B.

As illustrated in FIG. 3B, if a connection point of the first link member 3 and the handle base 1 is (P13), a connection point of the first link member 3 and the operation handle 2 is (P23), the connection point of the second link member 4 and the handle base 1 is (P14), a connection point of the second link member 4 and the operation handle 2 is (P24), and each connection point is set such that a distance between the connection points (P13, P14) is equal to a distance between the connection points (P13, P24), and a distance between the connection points (P14, P24) is equal to a distance between the connecting points (P13, P23). As illustrated in FIG. 3B, first and second links 3', 4', a handle base link 1', and an operation handle link 2' form a four-bar parallel crank mechanism.

Therefore, in this example, the operation handle 2 is held at the initial position in a state in which the first link member 3 comes into pressure contact with the first stopper member 19 of the handle base 1 by the urging force of the first torsion spring 18, and the occurrence of rattling due to a clearance at the connection point is prevented when the second link member 4 is in pressure contact with the second stopper member 20.

Further, a motor as an electric actuator 5 and a worm wheel 22 meshing with a worm gear 5*a* that is fixed to a rotation shaft of the motor 5 are disposed on the handle base 1. A cam member 23 having a cam surface 23*a* is connected to the worm wheel 22 that is rotatably driven around a rotation shaft 22*a*, and rotates coaxially with the worm wheel 22.

As illustrated in FIGS. 4A to 4C, the cam member 23 is disposed in a moving region of a follower portion 3*b* of the first link member 3, and when the motor 5 is driven from a state corresponding to the initial position of the operation handle 2 illustrated in FIG. 4A, the cam member 23 rotates clockwise in FIG. 4A. A rotation angle of the cam member 23 is detected by two sensors 24, 25, and an initial position correspondence state illustrated in FIG. 4A and a use position correspondence state illustrated in FIG. 4C are identified.

When the cam member 23 is rotatably driven from the state illustrated in FIG. 4A and restraint of the first link member 3 by the first stopper member 19 is released, a planar follower surface 3*c* formed at a front end of the follower portion 3*b* of the first link member 3 comes into pressure contact with the cam surface 23*a* of the cam member 23 by the first torsion spring 18, and thereafter follows a change of the cam surface 23*a* (see FIG. 4B).

When the cam member 23 is further rotatably driven from this state, the follower surface 3*c* is pushed by the cam surface 23*a* and held at an operational rotation position illustrated in FIG. 4C, and the first link member 3 can be returned to the initial rotation position by driving the cam member 23 counterclockwise from this state.

As described above, since the first and second link members 3, 4, the operation handle and the handle base 1 form the four-bar parallel crank mechanism, the operation handle 2 moves to the use position illustrated in FIG. 5A from the initial position while maintaining a parallel posture. At the use position, the handhold recessed portion 14 buried in the door at the initial position is exposed to an outside, and a sufficient hand holding space (S) is ensured between the handhold recessed portion 14 and the door surface. Thereafter, a door latch device can be unlatched by inserting a hand into the hand holding space (S) and pulling the operation handle 2 toward the outside of the door and moving the operation handle 2 to an unlatched position illustrated in FIG. 5B.

In order to prevent the operation handle 2 from further moving in the pulling-out direction from the unlatched position, the operation handle 2 and the handle base 1 are provided with appropriate stoppers (not shown) that are locked at the unlatched position to regulate a pull-out side stroke.

In this example, the unlatch of the door latch device is performed by an electric actuator (not shown). That is, as illustrated in FIG. 5B, when the operation handle 2 is moved to the unlatched position, a switch pushing portion 13*a* protruding from the rear link connection portion 13 of the operation handle 2 pushes a microswitch 26 attached to the handle base 1, thereby driving the electric actuator for unlatching to unlatch the door latch device.

In this state, the door opening operation can be performed by pulling the operation handle 2 toward an outside of the vehicle. Thereafter, when a pulling-out operation force applied to the operation handle 2 is released, the operation handle 2 moves at an initial position direction by restoring forces of the first and second torsion springs 18, 21, and stops at the use position where the follower surface 3*c* of the first link member 3 comes into contact with the cam surface 23*a*.

Figure 5B:
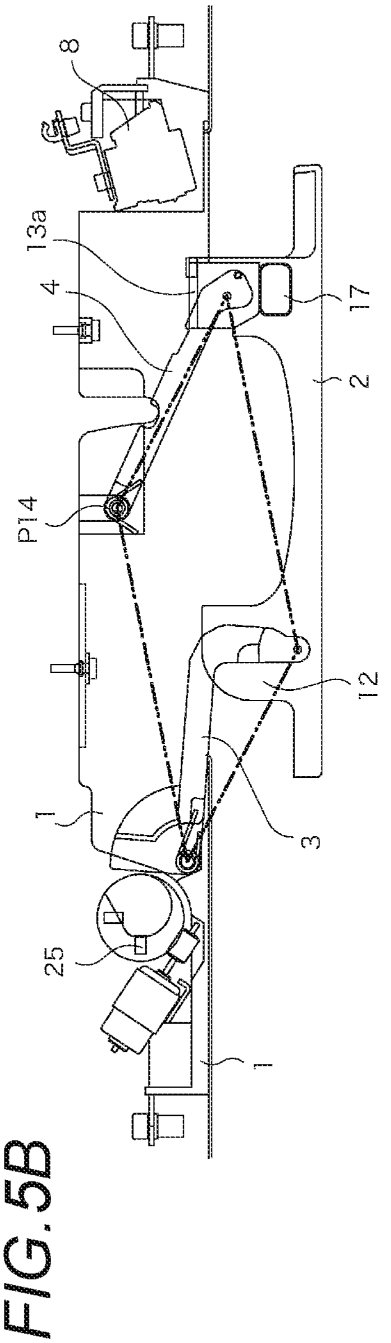

When the operation handle 2 moves to the use position, as illustrated in FIG. 5B, the initial position return switch 17 immersed in the door at the initial position is exposed to the outside of the door, and when the initial position return switch 17 is touched in this state, the electric actuator 5 is driven and the operation handle 2 returns to the initial position.

Therefore, in this example, when the locking/unlocking switch portion 16 disposed in the pressing operation portion 9 is touched, an authentication operation for a portable device (not shown) carried by the user is started, and when the authentication is established, the door latch device shifts to an unlocked state, the motor 5 is further driven, and the operation handle 2 moves to the use position.

When the operation handle 2 is moved from this state to the unlatched position, the microswitch 26 is pressed to drive the actuator for unlatching. By driving the actuator, the door latch device is unlatched, and when the operation handle 2 is further pulled, the door can be opened.

Further, when the locking/unlocking switch portion 16 is touched in a state in which the door is closed, an authentication operation for the portable device carried by the user is started, and when the authentication is established, the operation handle 2 is returned to the initial position, and the door latch device is shifted to a locked state.

In contrast, when the initial position return switch 17 is touched in a state in which the operation handle 2 is at the use position, only an operation of returning the operation handle 2 to the initial position is performed without locking the door latch device.

Figure 6A:
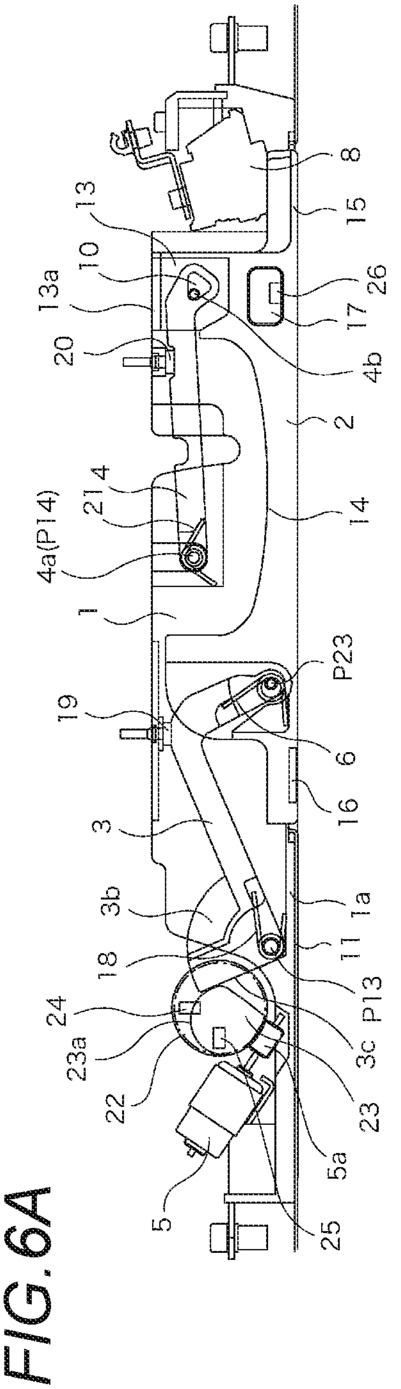
FIGS. 6A and 6B are diagrams illustrating another embodiment of the present invention.
Figure 6B:
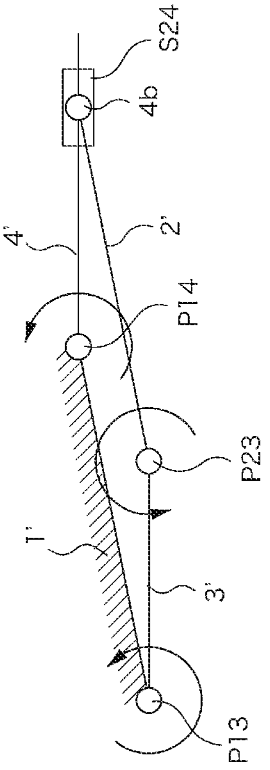

FIGS. 6A and 6B show another embodiment of the present invention. In the present embodiment, components that are substantially identical to those in the above-described embodiment are denoted by the same reference numerals in the drawings, and description thereof is omitted.

A configuration in this example is the same as that of the above-described embodiment except that a slide hole 10 into which a pin 4*b* protruding from the operation handle 2 is loosely fitted is formed in the second link member 4 of the above-described embodiment, and a torsion spring 6 that applies an urging force to the operation handle 2 counterclockwise with reference to the first link member 3 is wound around the connection point of the first link member 3 and the operation handle 2.

As a result, roughly as illustrated in FIG. 6B, a link configuration in the present example becomes a five-bar linkage mechanism in which a sliding pair (S24) slidable along the link 4' is added to the pin connection point (P24) in FIG. 39. In the link mechanism of this example in which positions of the connection points (P13, P23, P14) are the same as those in the above-described embodiment and only a position of the connecting point (P24) is variable, as illustrated in FIG. 6A, the variable connection point (P24) is almost restrained at a top portion of the slide hole 10 formed in a triangle by a restoring force of one of the torsion springs 6, 18, 21 or a combination of these restoring forces and thus the link mechanism is substantially operated as the four-bar parallel crank mechanism.

Figure 7A:
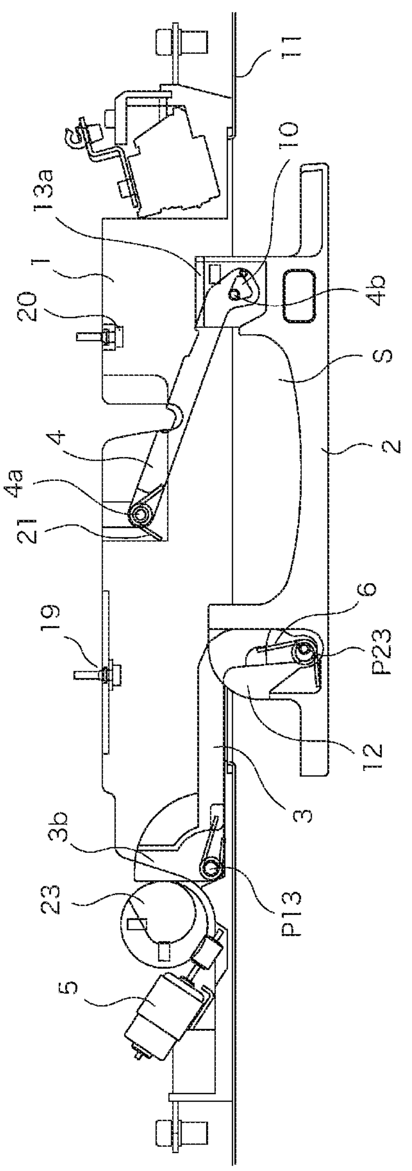

As a result, when the electric actuator 5 is driven from a state in which the operation handle 2 is at the initial position illustrated in FIG. 6A, the operation handle 2 moves to the use position illustrated in FIG. 7A while maintaining the posture parallel to the initial position.

Figure 7B:
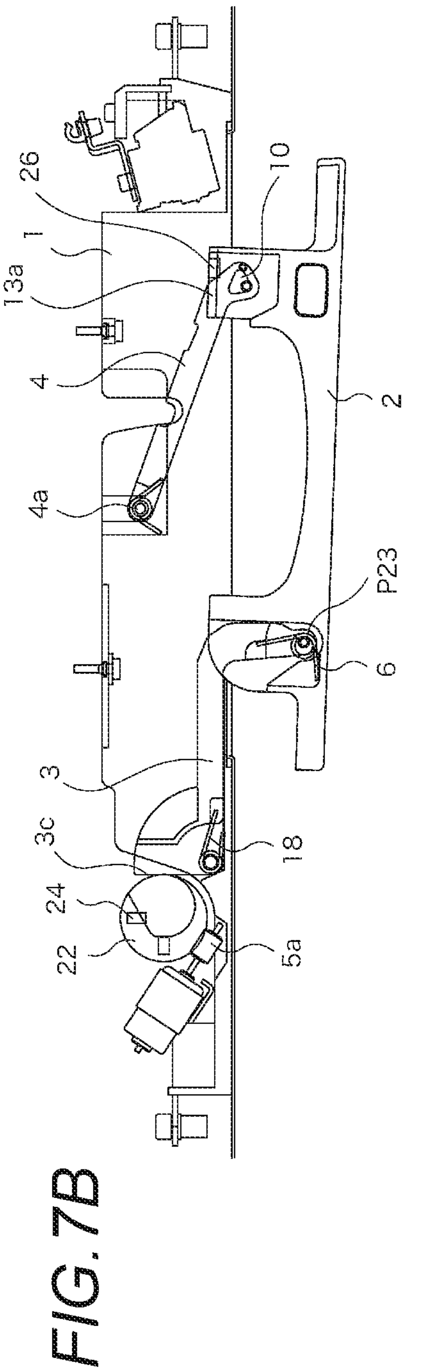
FIG. 7B is a diagram illustrating an unlatched state.

When the operation handle 2 is further pulled out toward the outside of the door from this state, as illustrated in FIG. 7B, the operation handle 2 rotates clockwise in FIG. 7B around the connection point (P23) with the first link member 3. This posture corresponds to the unlatched position of the above-described embodiment.

By the movement to the unlatched position, the switch pushing portion 13*a* of the operation handle 2 pushes the microswitch 26 of the handle base 1, thereby driving the electric actuator for unlatching to unlatch the door latch device.

Figure 8:
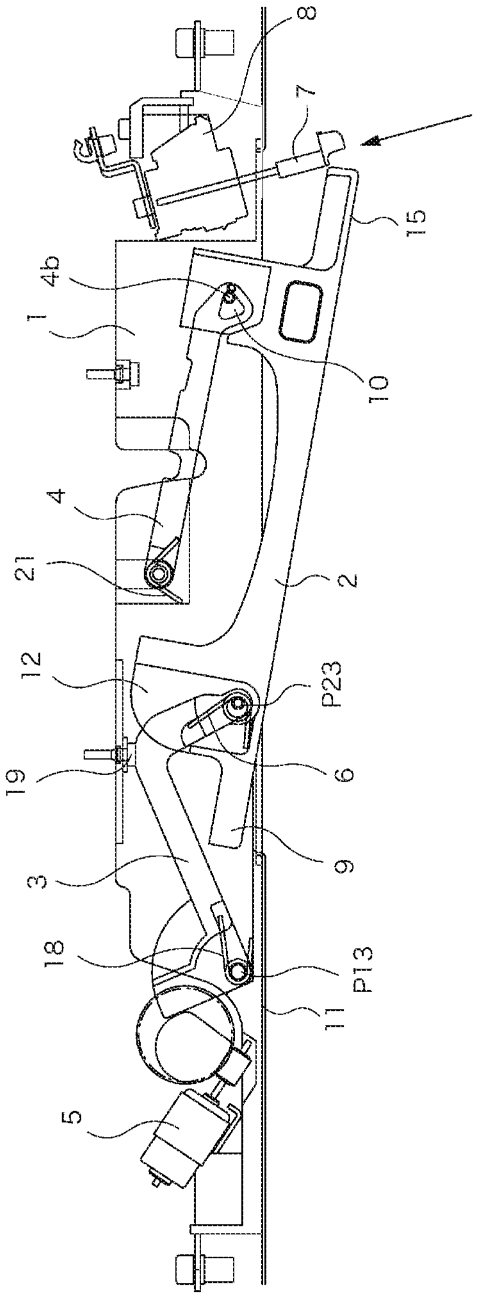
FIG. 8 is a diagram illustrating an emergency state.

Further, in the present example, since a play is formed between the slide hole 10 and the pin 4*b*, when the operation handle 2 is at the initial position, as illustrated in FIG. 8, the operation handle 2 can be shifted to an emergency operation position by being rotated clockwise in FIG. 8 around the connection point (P23) of the operation handle 2 and the first link member 3.

The movement to the emergency operation position is performed by pushing the pressing operation portion 9 into the door, the cylinder shielding portion 15 of the operation handle 2 at the emergency operation position is lifted from the door surface, and as a result, a gap is formed between the cylinder shielding portion 15 and the door surface.

A cylinder lock 8 is disposed at a position where an unlocking key 7 can be inserted by using the gap formed at the emergency operation position, and the user can operate the cylinder lock 8 by inserting the unlocking key 7 into the cylinder lock 8 from a direction indicated by an arrow in FIG. 8 after the operation handle 2 is moved to the emergency operation positron.

Therefore, in this example, in a case where the authentication operation cannot be performed due to running out of a battery of the portable device, after the operation handle 2 is manually moved to the emergency operating position, when the cylinder lock 8 is operated using the unlocking key 7, the door latch device shifts to the unlocked state, and thereafter, the door can be opened by performing an operation similar to a normal operation.

Further, in the embodiment of FIGS. 6A and 6B and subsequent drawings, an example for enabling a shift to the substantially emergency state is shown by arranging positions of connecting pins of the links 1', 2', 3', and 4' in the positions including the parallel crank mechanism and by setting a slide amount in a sliding pair to be small.

However, it is also possible to appropriately set the relationship between the positions of the links 1', 2', 3', 4' and length of the links such that the operation handle at the initial position is parallel to the operation handle at the use position without maintaining a parallel relationship during the movement of the operation handle from the initial position to the use position.

According to one or more embodiments, a door handle device for a vehicle includes a handle base 1, an operation handle 2, first and second link members 3, 4 disposed at an interval and rotatably pin-connected to the handle base 1 respectively, and an electric actuator 5 configured to rotatably drive the first link member 3. The operation handle 2 is connected to the handle base so as to be able to protrude from an initial position to a use position. The operation handle is rotatably connected to end portions of the first and second link members. The handle base, the first and second link members, and the operation handle include a link mechanism in which the operation handle at the use position maintains a posture parallel to the initial position.

Both end portions of the operation handle 2 are connected to the first and second link members 3, 4, the first and second link members 3, 4 are pin-connected to the handle base 1, and a link mechanism is formed in which the handle base 1 is a fixed link and the first and second link members 3, 4 and the operation handle 2 are movable links.

In the link mechanism, a length of each link and pairs of the first and second link members 3, 4 and the operation handle 2 are appropriately adjusted such that the operation handle 2 takes a posture parallel to the initial position when protruding from the initial position to the use position. The operation handle 2 may include a non-parallel posture during the movement, in addition to the case where the operation handle 2 takes the parallel posture in the entire movement process from the initial position to the use position like a parallel crank mechanism.

According to another embodiment, by taking the posture at the use position in parallel to the initial position, a substantial operation portion can be widened as compared with a case where one end is as a rotation center and a rotation tip end portion is operated, the operation of opening the door by holding the operation handle 2 by hand is facilitated.

In particular, in order to ensure a sufficient handheld space when operating the rotation tip end portion, a protrusion size from a door surface becomes large, but in the embodiment in which the use position is parallel to the initial position, an entire back surface of the operation handle 2 can be used as a handheld portion, so that it is possible to suppress the protrusion size from the door surface when the operation handle 2 is operated without lowering the operability.

Further, since the handle base 1 is fixed to the door, rain water that has traveled through the door, wash water during vehicle washing and the like often adhere to the handle base 1, and the handle base may freeze in cold regions and malfunction. Particularly, a sliding pair has a route length longer than a rotating treatment, and since the route is often exposed to the outside, the possibility of freezing increases. By using the pin connection for the connection between the handle base 1 and the first and second link members 3, 4 while avoiding the sliding pair, it is possible to reduce the risk of malfunction due to freezing.

According to another embodiment, the door handle device for a vehicle may be configured as a five-bar slider crank mechanism in which a connection portion between another link and the operation handle 2 becomes a rotating and sliding pair by making a connection portion between one of the first and second link members 3, 4 and the operation handle 2 into a rotating pair.

Although the five-bar slider crank mechanism is an unlimited chain mechanism with two degrees of freedom, by applying an urging force for holding a connecting pin forming the rotating and sliding pair at an end position of the sliding pair by the link or the torsion spring 6 wound around the rotation center of the operation handle 2, the five-bar slider crank mechanism can function as a substantially limited chain.

As a result, conditions such as the first and second link members 3, 4 having the same length can be relaxed, and a degree of freedom in disposing each link can be increased.

Further, according to another embodiment, the operation handle 2 may be able to be swung at the initial position by utilizing the increase in the degree of freedom. In the door handle device for a vehicle, a cylinder lock may be fixed to the handle base. The cylinder lock may be covered by the operation handle at the initial position and capable of being operated by an unlocking key in a swinging state.

In the handle device configured as described above, when the cylinder lock 8 is disposed on a swinging tip end side, even when the electric actuator 5 becomes inoperable, the operation handle 2 can be swung to expose the cylinder lock 8 hidden by the operation handle 2 in the initial state. Thereafter, by operating the cylinder lock 8 by using the predetermined unlocking key 7, the door latch device can be shifted to an unlocked state.

According to another embodiment, the operation handle may include a pressing operation portion at an end portion of a swing center side. The pressing operation portion may be configured to shift the operation handle to the swinging state by a pushing operation.

According to another embodiment, in the door handle device for a vehicle, connecting pins of the first and second link members, the operation handle, and the handle base may be arranged in positions including a parallel crank. A connection portion of the second link member and the operation handle includes a slide hole into which the connecting pin of the operation handle is movably fitted.

According to one or more embodiments, since the operation handle at the use position maintains the posture parallel to the initial position, it is possible to provide the user with a wide operation portion and improve the usability.

The invention claimed is:

1. A door handle device for a vehicle comprising:

a handle base;

an operation handle;

first and second link members disposed at an interval and rotatably pin-connected to the handle base, respectively, each of the first and second link members consisting of a single link; and an electric actuator configured to rotatably drive the first link member, wherein the operation handle is connected to the handle base so as to be able to protrude from an initial position to a use position, wherein the operation handle is rotatably connected to end portions of the first and second link members, wherein the handle base, the first and second link members, and the operation handle form a link mechanism in which the operation handle at the use position maintains a posture parallel to the initial position, and wherein the link of one of the first and second link members is pin-connected to the operation handle, and the link of the other is connected to the operation handle by a slide hole and a connecting pin attached to the operation handle, which connecting pin fits in the slide hole.

2. The door handle device for a vehicle according to claim 1, wherein a torsion spring restraining the link mechanism is attached to the operation handle or the link of one of the first and second link members.

3. The door handle device for a vehicle according to claim 2, wherein the operation handle is swingable around a connection point with one of the first and second link members at the initial position, wherein a cylinder lock is fixed to the handle base, and wherein the cylinder lock is covered by the operation handle at the initial position and capable of being operated by an unlocking key in a swinging state.

4. The door handle device for a vehicle according to claim 3, wherein the operation handle includes a pressing operation portion at an end portion of a swing center side, and wherein the pressing operation portion is configured to shift the operation handle to the swinging state by a pushing operation.

5. The door handle device for a vehicle according to claim 2, wherein connecting pins of the first and second link members, the operation handle, and the handle base are arranged in positions forming a parallel crank, and wherein a connection portion of the second link member and the operation handle includes the slide hole, which is a triangular slide hole into which the connecting pin of the operation handle is movably fitted.

6. The door handle device for a vehicle according to claim 1, wherein the connecting pin moves from the predetermined portion of the slide hole to a second portion of the slide hole against a force of the torsion spring so that the operation handle moves from the use position to the unlatched position at which a door latch device is unlatched.

7. The door handle device for a vehicle according to claim 1, wherein the slide hole has a triangular shape.

* * * * *